United States Patent
Zhang

(10) Patent No.: US 8,473,534 B2
(45) Date of Patent: Jun. 25, 2013

(54) METHOD FOR USE IN A DIGITAL FREQUENCY SYNTHESIZER

(75) Inventor: Yang Zhang, Shanghai (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 918 days.

(21) Appl. No.: 12/531,764

(22) PCT Filed: Mar. 20, 2007

(86) PCT No.: PCT/SE2007/050174
§ 371 (c)(1),
(2), (4) Date: Sep. 17, 2009

(87) PCT Pub. No.: WO2008/115107
PCT Pub. Date: Sep. 25, 2008

(65) Prior Publication Data
US 2010/0109715 A1 May 6, 2010

(51) Int. Cl.
*G06F 1/02* (2006.01)
*G06F 17/10* (2006.01)

(52) U.S. Cl.
USPC ........... 708/271; 708/290; 708/313; 704/265; 386/271; 381/94.4

(58) Field of Classification Search
USPC ........................................................ 708/271
See application file for complete search history.

(56) References Cited

U.S. PATENT DOCUMENTS

| 5,999,581 | A  | * | 12/1999 | Bellaouar et al. | 375/377 |
| 7,440,987 | B1 | * | 10/2008 | Song et al. | 708/276 |
| 2003/0062929 | A1 | | 4/2003 | Langlois et al. | |

FOREIGN PATENT DOCUMENTS

EP  1469373 A1  10/2004

OTHER PUBLICATIONS

De Caro, D. et al, "High-Performance Direct Digital Frequency Synthesizers Using Piecewise-Polynomial Approximation", IEEE Transactions on Circuits and Systems I: Fundamental Theory and Applications, IEEE Inc., New York, US, Feb. 2005, vol. 52, pp. 324-337.
Office Action issued in corresponding Japanese application No. 2010-500865 on Dec. 20, 2011 and a Summary of Grounds for Rejection in English, 6 pages.

* cited by examiner

*Primary Examiner* — Henry Tsai
*Assistant Examiner* — Dean Phan
(74) *Attorney, Agent, or Firm* — Rothwell, Figg, Ernst & Manbeck, P.C.

(57) ABSTRACT

A method for use in a digital frequency synthesizer, the method comprising phase to amplitude conversion of an output value of a phase accumulator in said synthesizer, said conversion being carried out as an approximation (y) of a phase value (x) which corresponds to said output amplitude value, the method being characterized in that the approximation comprises a combination of a linear interpolation value and a second order sinusoidal value, the second order sinusoidal value being used as an error term to correct for errors in the linear interpolation value.

7 Claims, 7 Drawing Sheets

METHOD FOR USE IN A DIGITAL FREQUENCY SYNTHESIZER

CROSS-REFERENCE TO RELATED APPLICATION

This application is a 35 U.S.C. §371 National Phase Application from PCT/SE2007/050174, filed Mar. 20, 2007, and designating the United States, which published as international publication number WO 2008/115107 A1, which publication is incorporated by reference herein.

TECHNICAL FIELD

The present invention discloses a method and a device for use in a digital frequency synthesizer, particularly in a direct digital frequency synthesizer, DDFS.

BACKGROUND

In many modern electronic systems, such as, for example, communication transceivers, radar systems, test instrumentation and broadcasting systems, Direct Digital Frequency Synthesizers, DDFS, are an important component.

DDFSs can provide rapid frequency switching in small frequency steps, and can also provide linear phase and frequency shifting with a high degree of spectral purity.

A common DDFS architecture is one which is based on a phase accumulator in series with a phase-to-sinusoid amplitude converter. Such a DDFS usually uses two inputs: a clock reference and a frequency control word, FCW. The phase accumulator in the DDFS integrates the value of the FCW on every clock cycle, producing a ramp whose slope is directly proportional to the FCW.

The frequency of this ramp, which is also the output frequency of the synthesizer, is given by the expression:

$$f_{out} = FCW \times \frac{f_0}{2^w} \quad (1)$$

where:
f$_0$ is the frequency of the clock reference, and
W is the width of the accumulator in bits.

The phase accumulator contents can be interpreted as a portion of rotation around a unit circle, and an approximate sinusoid amplitude of the corresponding angle is produced by the phase-to-sinusoid amplitude converter.

One way of implementing the phase-to-sinusoid amplitude converter is as a ROM look up table, an LUT. In order to satisfy frequency resolution requirements in the DDFS, a wide phase accumulator is often desired. However, this leads to a very large LUT as a converter, since the number of bits the LUT contains is equal to $2^N \times (L+1)$, where L+1 is the output word length of the converter, including a "sign bit".

One step towards reducing the LUT size is to reduce the number of entries in the table by exploiting the quadrant symmetry of the sine function. For further reduction, there are several alternatives to the ROM LUT, such as angular decomposition, sine amplitude compression, and the use of Coordinate Rotation Digital Computers, CORDIC, as well as polynomial approximations. The principle of these techniques is to trade computational complexity for ROM storage.

One of the main performance parameters for the phase to amplitude converter of the DDFS is the so called Spurious Free Dynamic Range, the SFDR. In the frequency domain, the SFDR represents the difference in amplitude or power between the generated sinusoid and the greatest undesired spectral component.

SFDR can also be a significant parameter for sensitivity and anti-interference performance in many applications. However, in known systems, a satisfactory SFDR is obtained at the price of high circuit complexity, for example in terms of storage need and the amount of computational power needed.

SUMMARY

As explained above, there is a need in Direct Digital Frequency Synthesizers, DDFS, for obtaining a good SFDR with a high degree of storage efficiency and also for implementation efficiency in terms of the amount of computational power needed.

This need is addressed by the present invention in that it discloses a method for use in a digital frequency synthesizer, which method comprises phase to amplitude conversion of an output value of a phase accumulator in the synthesizer.

The conversion according to the invention is carried out as an approximation of an amplitude which corresponds to an output phase value of the phase accumulator, the approximation comprising a combination of a linear interpolation value and a second order sinusoidal term, the second order sinusoidal term being used as an error term to correct for errors in the linear interpolation value.

By means of the invention, as will be seen more closely from the following detailed description, a very good SFDR performance can be obtained without a high degree of hardware complexity.

The invention also discloses a digital direct frequency synthesizer, DDFS, with means for carrying out the method of the invention.

BRIEF DESCRIPTION OF THE DRAWINGS

The invention will be described in more detail with reference to the appended drawings, in which.

DETAILED DESCRIPTION

Figure 1:
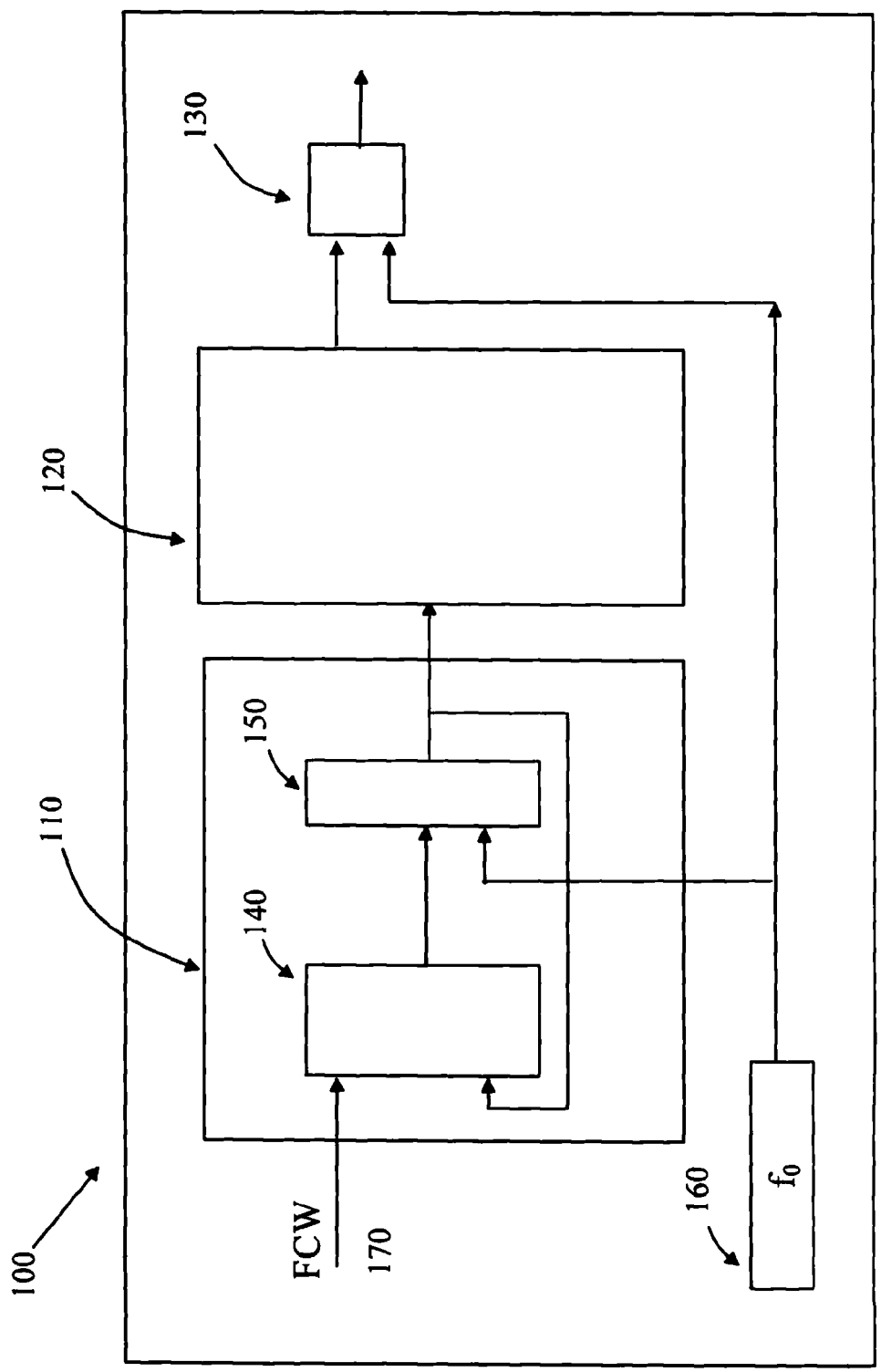
FIG. 1 shows a frequency synthesizer in which the invention can be applied.

FIG. 1 shows an example of a typical Direct Digital Frequency Synthesizer 100, DDFS, to which the invention may be applied. The architecture of the DDFS 100 in FIG. 1 is based on two main blocks: a phase accumulator 110 and a phase-to-sinusoid amplitude converter 120.

The phase accumulator 110 comprises an adder 140, the output of which is fed to a register 150.

A digital-to-analog converter, DAC, and a low-pass filter, LPF, both shown as 130 in FIG. 1, can be connected to the output of the converter 120 if an analog output is desired from the DDFS 100. The DDFS 100 has two inputs: a clock reference f$_0$, 160, and a frequency control word, FCW, 170. The phase accumulator 110 integrates the value of the FCW on every clock cycle, and in doing so, produces a ramp whose slope is directly proportional to the FCW.

The frequency of this ramp, which is also the output frequency $f_{out}$ of the synthesizer 100, is given by the following expression:

$$f_{out} = FCW \times \frac{f_0}{2^W}$$

where:
$f_0$ is the frequency of the clock reference, and
W is the width of the accumulator in bits.

The phase accumulator contents are interpreted as a portion of rotation around the unit circle, and an approximated sinusoid amplitude of the equivalent angles is produced by the phase-to-sinusoid amplitude converter. The performance of the phase-to-sinusoid amplitude converter 120 is thus of central interest to the performance of the entire DDFS 100, both when it comes to performance and to complexity.

As explained previously in this text, one way of designing a phase-to-sinusoid amplitude converter is as a lookup table, LUT, usually as a ROM. As also explained previously, a LUT has certain disadvantages which it is desired to overcome with the present invention.

Thus, according to the present invention, a new method of performing the function of the phase-to-sinusoid amplitude converter is disclosed. Basically, the method of the invention can be explained as an approximation which involves a linear interpolation and a second order sinusoidal approximation to the ideal sinusoid.

It can be mentioned that bit-true simulation of the invention shows a 112.5 dB SFDR at 16 bit output, which is only 1.9 dB lower than the theoretically possible value.

Turning now to how the approximation of the current invention is carried out, it can be seen that one way of carrying out a phase to amplitude conversion is by means of polynomial approximation, of which one subset is so called linear interpolation.

Figure 2:
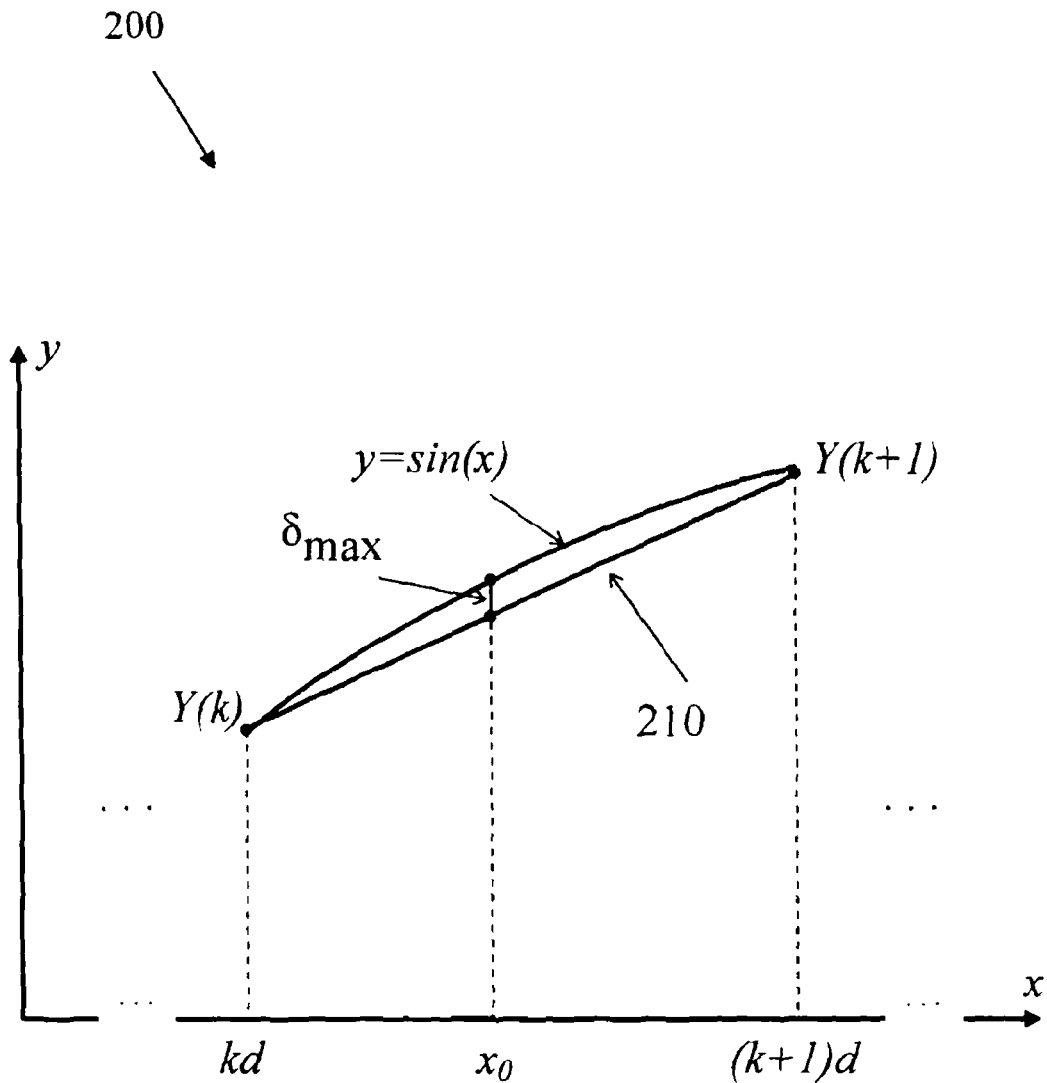
FIG. 2 shows a principle of linear interpolation.

FIG. 2 illustrates a straightforward linear interpolation approximation method: y is a function of x, in the example shown y is a sine function of x. In FIG. 2, a linear interpolation 210 of the sine function is also shown. As can be realized, and as will also be seen from FIG. 2, this interpolation method is not a particularly accurate one.

With continued reference to FIG. 2, for an ideal sinusoid y, which is defined as $$y = \sin(x), \quad (1)$$

with x ranging from 0 to $2\pi$ radians,
if the sequence Y(n):

$$Y(n) = \sin(n^*d), \quad 0 \le n \le 2^N - 1, \quad d = \frac{2\pi}{2^N}, \quad (2)$$

is known, then the linear interpolation in FIG. 2 can be expressed as $$y_{int\,erp}(x) = Y(k) + \frac{Y(k+1) - Y(k)}{d} \cdot (x - kd), \quad k = \left\lfloor \frac{x}{d} \right\rfloor \quad (3)$$

where $\left\lfloor \frac{x}{d} \right\rfloor$ denotes the "integer part".

The interpolation error $\delta(x)$ of expression (3) can be written as:

$$\delta(x) = \sin(x) - y_{interp}(x) \quad (4)$$

The peak error on each interpolation segment can be obtained via partial derivation. Assume that $$\left.\frac{\partial \delta(x)}{\partial x}\right|_{x=x_0} = 0 \quad (5)$$

Now, substituting equations (3) and (4) into (5), we see that:

$$\cos(x_0) = \frac{Y(k+1) - Y(k)}{d} \quad (6)$$

and thus:

$$x_0 = \arccos\left[\frac{Y(k+1) - Y(k)}{d}\right] = \arccos\left[\frac{\sin(kd+d) - \sin(kd)}{d}\right] \quad (7)$$

$$= \arccos\left[\frac{\sin\left(\frac{d}{2}\right)}{\left(\frac{d}{2}\right)}\cos\left(kd + \frac{d}{2}\right)\right]$$

Accordingly, for small values of d, $x_0 \approx kd + d/2$ will maximize $\delta(x)$. The maximum value of $\delta(x)$ can be expressed as the difference between $\sin(x_0)$ and the linear interpolation, thus:

$$\delta_{max}(x) \approx \sin(x_0) - \left[\frac{\sin(kd+d) - \sin(kd)}{d} \cdot \frac{d}{2} + \sin(kd)\right] \quad (8)$$

$$\approx \sin\left(kd + \frac{d}{2}\right) - \frac{1}{2}[\sin(kd+d) + \sin(kd)]$$

$$= \sin\left(kd + \frac{d}{2}\right) - \sin\left(kd + \frac{d}{2}\right) \cdot \cos\left(\frac{d}{2}\right)$$

$$= \left[1 - \cos\left(\frac{d}{2}\right)\right] \cdot \sin\left(kd + \frac{d}{2}\right)$$

Figure 3:
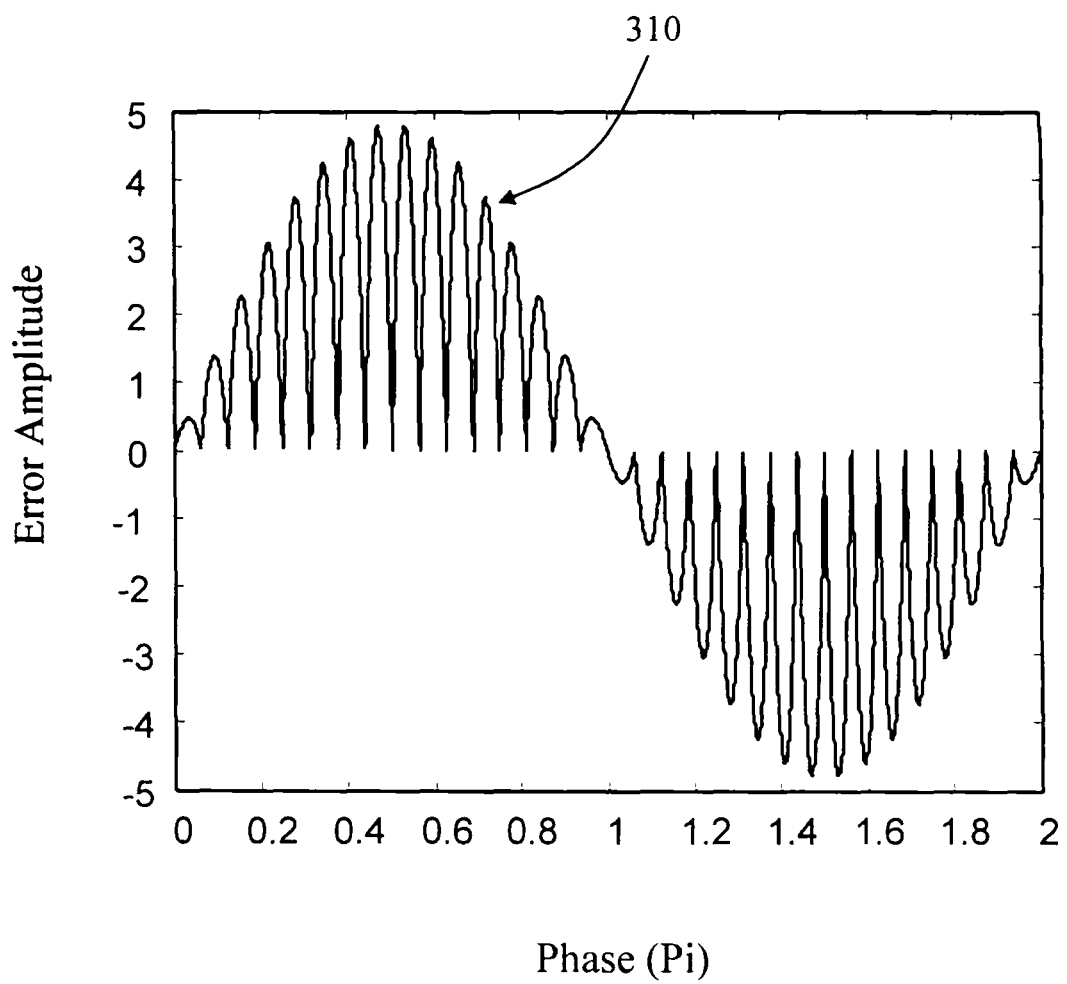
FIG. 3 shows an error diagram.

FIG. 3 shows the amplitude in error for a linear interpolation of an ideal sinusoid, the error amplitude being shown as a function of phase, with the phase expressed in radians, from 0 to $2\pi$.

Thus, from FIG. 3 in combination with equation (8) above, we can see that $\delta_{max}$ holds a quasi-sinusoidal envelope. It should be noted that $$1 - \cos\left(\frac{d}{2}\right)$$

is a constant for a given d.

If the interpolation error err(x) of each interpolation segment in FIG. 3, i.e. the "teeth-like" wavelets inside the envelope, one of which, 310, is shown in FIG. 3 for the sake of clarity, is approximated by the first-half cycle of sinusoid with the amplitude $\delta_{max}(x)$, we find:

$$err(x) = \delta_{max}(x) \cdot \sin\left(\frac{x - kd}{d}\pi\right) \quad (9)$$

By combining equations (8) and (9), we find that:

$$y(x) \approx y_{int\;erp}(x) + err(x) \qquad (10)$$

$$= Y(k) + \frac{Y(k+1) - Y(k)}{d} \cdot (x - kd) +$$

$$\left[1 - \cos\left(\frac{d}{2}\right)\right] \cdot \sin\left(kd + \frac{d}{2}\right) \cdot \sin\left(\frac{x-kd}{d}\pi\right)$$

For small values of d, sin(kd+d/2) can be approximated by sin (kd), and with reference to equation (2) above, sin (kd) can be replaced with Y(k). Also, $$\sin\left(\frac{x-kd}{d}\pi\right)$$

can be approximated by $$Y\left(\left\lfloor \frac{x-kd}{d} \cdot 2^{N-1} \right\rfloor\right)$$

as well. So equation (11) below can be seen as:

$$y(x) \approx Y(k) + \frac{Y(k+1) - Y(k)}{d} \cdot (x - kd) + \qquad (11)$$

$$Y(k) \cdot Y\left(\left\lfloor \frac{x-kd}{d} \cdot 2^{N-1} \right\rfloor\right) \cdot \left[1 - \cos\left(\frac{d}{2}\right)\right].$$

$$k = \left\lfloor \frac{x}{d} \right\rfloor$$

where:

$$k = \left\lfloor \frac{x}{d} \right\rfloor$$

means that k is the integer part of x/d, and $$Y(k) = \sin(k \cdot d), \text{ and}$$

$$d = 2 \cdot \pi / 2^N, \text{ with N being a natural number}$$

It can be seen that for a given d, only x and Y(k) are necessary inputs for approximating y(x) in Equation (11).

Equation (11) above can also be expressed in words as follows: y(x) is approximated by means of a combination of a linear interpolation value and a term which is an approximation of the residual error of the linear interpolation value, said residual error being expressed as a second order sinusoidal function, and used as an error term to correct for errors in the linear interpolation value.

For the sake of clarity, the linear interpolation value will be shown again, as:

$$Y(k) + \frac{Y(k+1) - Y(k)}{d} \cdot (x - kd) \qquad (12)$$

and the second order sinusoidal term is thus:

$$Y(k) \cdot Y\left(\left\lfloor \frac{x-kd}{d} \cdot 2^{N-1} \right\rfloor\right) \cdot \left[1 - \cos\left(\frac{d}{2}\right)\right] \qquad (13)$$

Equation (11) above can then be used to describe the desired function of a phase-to-amplitude converter of the invention.

Figure 4:
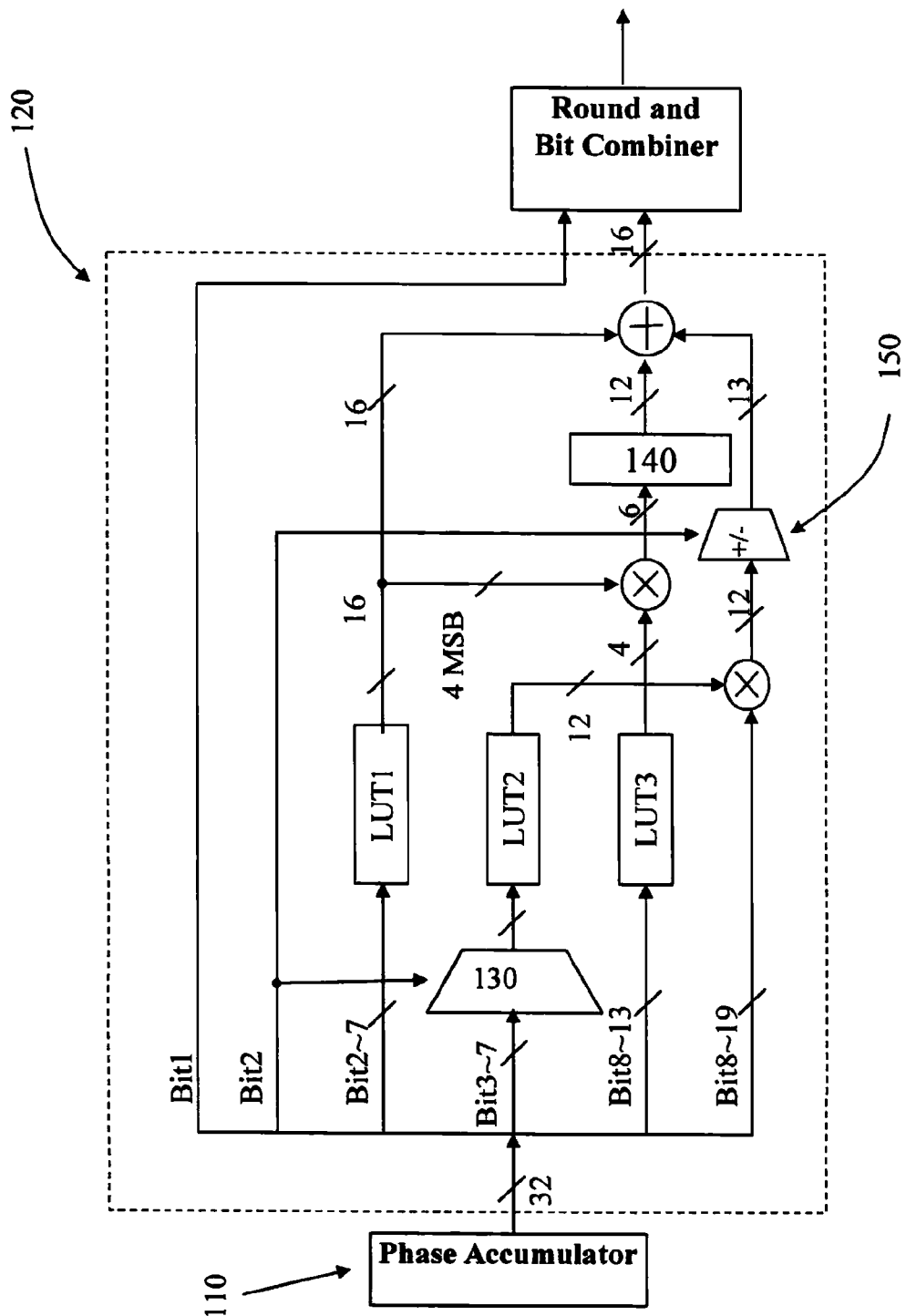
FIG. 4 shows an example of an embodiment of a phase to amplitude converter of the invention.

Turning now to an example of a possible implementation of a phase to amplitude converter of the invention, one example of such an embodiment 120 is shown in FIG. 4. In order to arrive at a suitable implementation of the method of the invention, only one LUT would in theory be necessary. However, due to practical considerations, such as, for example, obtaining an increased operating frequency, three different LUTs are used to in the circuit 120 to obtain the terms Y(k), Y(k+1)−Y(k), and $$Y\left(\left\lfloor \frac{x-kd}{d} \cdot 2^{N-1} \right\rfloor\right)$$

as follows, with reference to FIG. 4:

LUT1: $Y(k)$

LUT2: $Y(k+1) - Y(k)$

LUT3: $Y\left(\left\lfloor \frac{x-kd}{d} \cdot 2^{N-1} \right\rfloor\right)$

Taking $$d = \frac{2\pi}{2^7}$$

as an example, it can be realized that due to the symmetry of the sinusoid function, $2^{7-1}=64$ and $2^{6-1}=32$ entries are needed for obtaining Y(k) and Y(k+1)−Y(k), for LUT1 and LUT2 respectively.

Also, LUT 2 contains Y(k+1)−Y(k), but the term in equation (11) above is $$\frac{Y(k+1) - Y(k)}{d} \cdot (x - kd)$$

The total function of the expression given immediately above may be addressed as follows: The division by d does not need to be carried out since d is a power of 2. Instead, only a "right shift" is needed at the output of the multiplier to which the output of LUT 2 is connected, which can for example, be done by selecting the appropriate bits of the multiplier output.

As for the multiplication by (x−kd), there is actually no need to calculate x−kd, since k is the integer part of (x/d), and the value of x−kd is the value of (bit8~bit32), which we can truncate into 12 bits. The bit width used here will be a trade off between the balance between complexity and performance, but in one embodiment, we select 12 bits (in the case of N=7) as bit8~bit19.

Since LUT2 in FIG. 4 only covers ¼ period, function blocks 130 and 150 have been introduced into the circuit diagram in FIG. 4, block 130 being "1's complement" and block 150 being a "sign inverse" function. Both of these function blocks 130, 150, will be enabled when Bit 2=1, otherwise the data will just bypass these functions.

The word length of Y (k) is 16 bits, which explains the size of LUT1 as 64*16. This implies that the maximum value of Y (k+1)−Y(k) will be $2^{16}$*sin (d)=3216, and thus Y(k+1)−Y(k) can be fitted into 12 bits, which is the bitwidth of the output of LUT 2 in FIG. 4.

The maximum value of 3216 is arrived at in the following way: Looking at the shape of sin(x), it can be realized that the slope of the curve when x is small (say, for example, 0) is larger than when x is large (say pi/2). Actually, Y(k+1)−Y(k) is a description of the slope. So for small values of k, Y(k+1)−Y(k) will be comparatively greater. When k=1, the maximum is reached by Y(1)−Y(0)=sin(d), and for d=2π/128, the result will be 3216.

This is due to the fact that if 16 bits are used, then we get:

$$Y(k+1) - Y(k) = 2^{16} \cdot [\sin(kd+d) - \sin(kd)]2^{16} \cdot 2 \cdot \sin\left(\frac{d}{2}\right)\cos\left(kd + \frac{d}{2}\right)$$

Obviously, for a given d, since LUT2 only needs to cover ¼ period, the maximum value of Y(k+1)−Y(k) will be obtained when k=0, corresponding to $2^{16}$ sin(d)=$2^{16}$ sin(2π/128)= 3215.7, which can be rounded off to 3216.

The term 1−cos(d/2) in equation (11) can be seen as a weighting factor in equation (11), and can be calculated on or off-line. However, particularly in view of the bit-truncation effect in a design such as that of FIG. 4, the optimum weighting factor can also be determined by searching in the neighbourhood of 1−cos(d/2).

A properly chosen value for the weighting factor will bring the design in FIG. 4 to give an SFDR as close as possible to an SFDR calculated in a simulation, which in the case of equation (11) is 112.5 dB.

Figure 5:
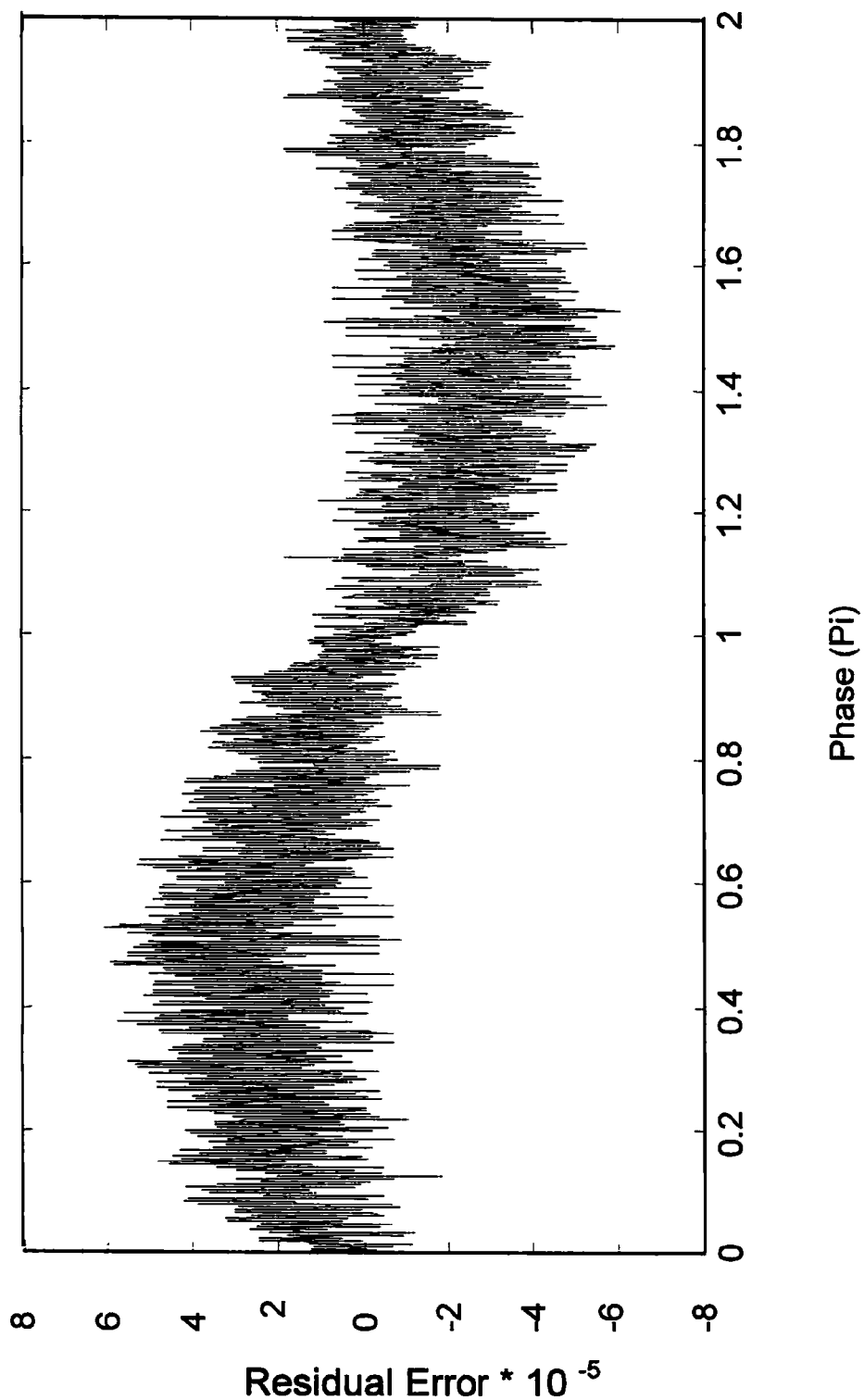
FIG. 5 shows a residual error diagram.
Figure 6:
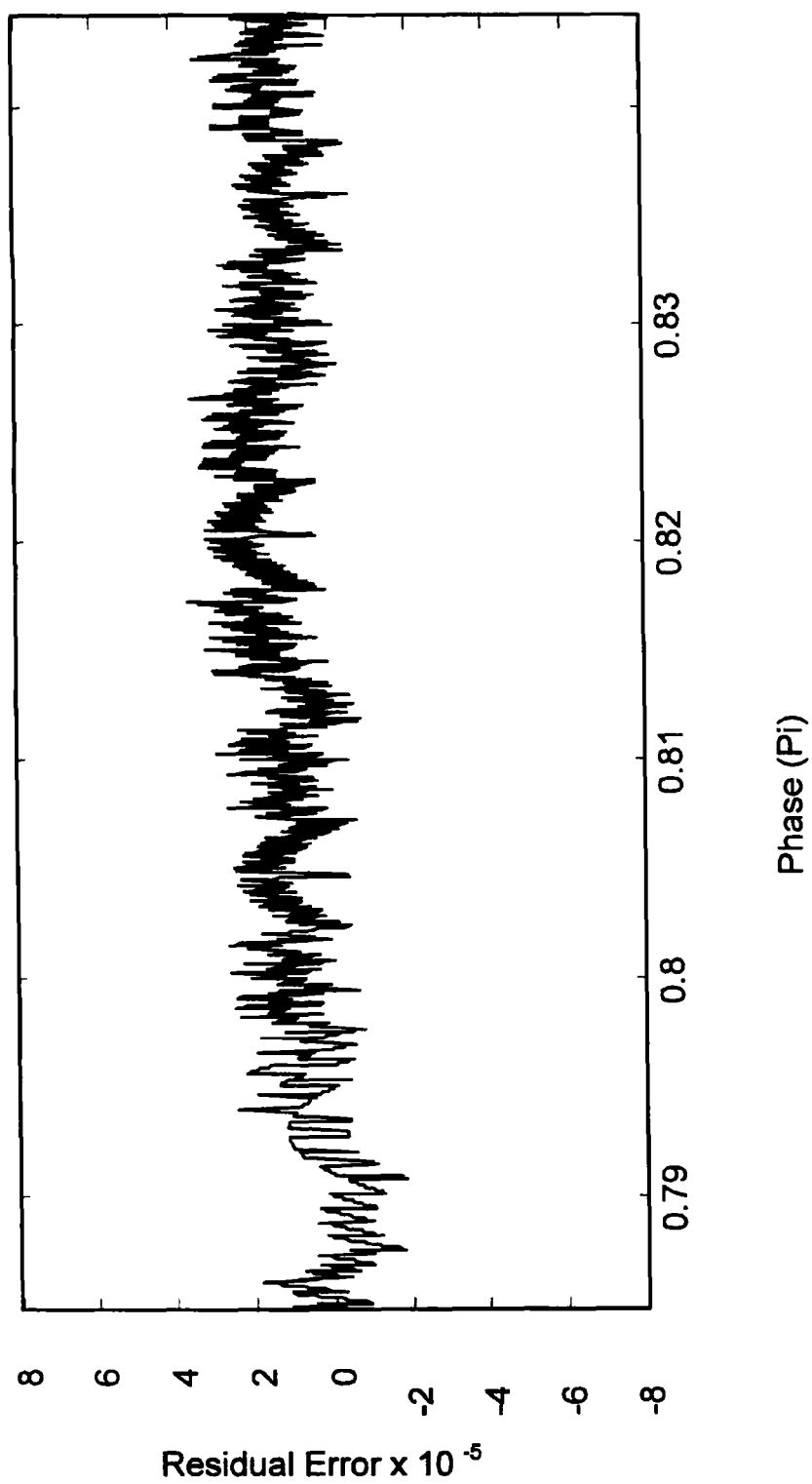
FIG. 6 shows a close up of a section of the diagram of FIG. 5.

FIG. 5 shows the residual error of the approximation of equation (11) by means of the design of FIG. 4 in the case of 112.5 dB SFDR, with the amplitude of the ideal sinusoid having been set to 1. FIG. 6 shows a "close up" of an arbitrarily chosen interval (0.79-0.84) from FIG. 5, included here in order to further show the property of residual error. From FIG. 6, we can see that the error is well randomized, which corresponds to a very flat power spectrum.

Figure 7:
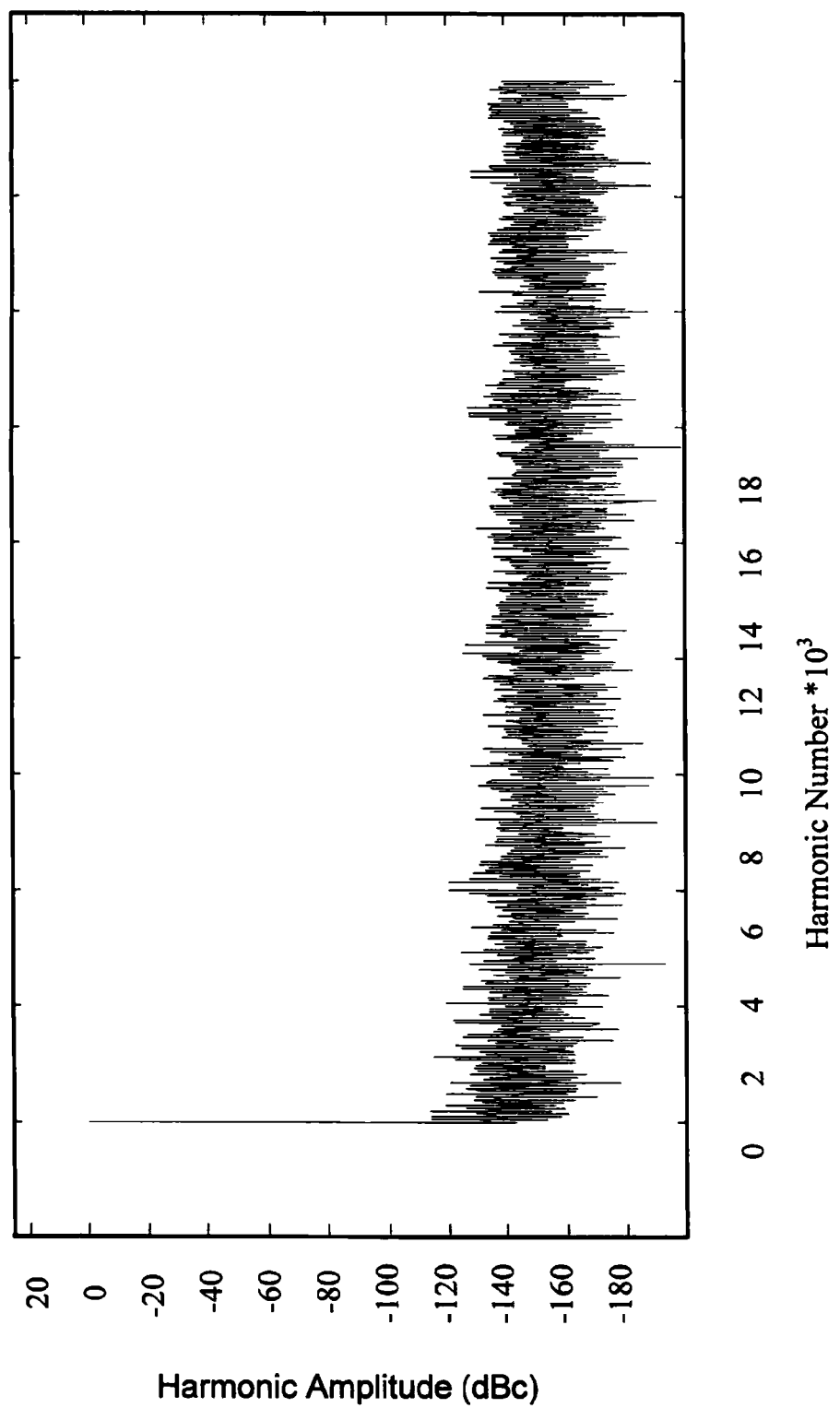
FIG. 7 shows a power spectrum of the diagram of FIG. 5.

FIG. 7 shows the power spectrum corresponding to FIG. 5, which underscores the fact that the time domain error is quite random.

In addition, it can be pointed out, with renewed reference to FIG. 4, that only 19 bits are used, and an SFDR of 112.5 dB is still reached, which is only about 1.9 dB below the theoretical limit of SFDR, defined as: SFDR≦6.02×M, with M being the input bitwidth of the phase to amplitude converter shown in FIG. 1. Thus, with 19 bits, M=19, and 6.02*19=114.38 dB, which is only 1.88 dB above the value obtained by the present invention, i.e. 112.5 dB.

Returning now to the design shown in FIG. 4, bit-true simulations have shown some simplifications which can be used without an unacceptable degradation of the function. It should be pointed out that the simplifications shown below can be used each on its own, or in combination with each other:

The first multiplication (linear interpolation) in equation (11) can be simplified to 12 bit×12 bit=13 bit in bitwidth. This is the multiplication $$\frac{Y(k+1) - Y(k)}{d} \cdot (x - kd)$$

The second multiplication in equation (11) can be 4 bit×4 bit=6 bit in bit width, which implies that $$Y\left(\left\lfloor \frac{x - kd}{d} \cdot 2^{N-1} \right\rfloor\right)$$

can be obtained via a 64 entry, 4 bit width LUT as LUT3 in FIG. 4. Thus, the 4 MSB of LUT 1 can be used as the data in LUT3 in FIG. 4. The multiplication in question is $$Y(k) \cdot Y\left(\left\lfloor \frac{x - kd}{d} \cdot 2^{N-1} \right\rfloor\right)$$

The third multiplication in Equation (11) can be carried out using adders, since 1−cos(d/2) is a constant. This is the multiplication $$Y\left(\left\lfloor \frac{x - kd}{d} \cdot 2^{N-1} \right\rfloor\right) \cdot \left[1 - \cos\left(\frac{d}{2}\right)\right]$$

In FIG. 4, the introduction of the weighting factor is indicated by means of the function block 140.

The invention is not limited to the examples of embodiments described above and shown in the drawings, but may be freely varied within the scope of the appended claims.

For example, the linear interpolation shown in FIG. 2 and used in the examples above is merely one example of a linear interpolation, namely a first degree linear interpolation, which may be used according to the invention in order to achieve the desired result. In principle, other kinds of linear interpolation may also be used to achieve the result of the invention.

Also, regarding the number of bits used in the LUTs above as inputs, outputs and width of the LUTs, it should be understood that these numbers of bits are merely examples, other amounts of bits may also be used in the LUTs.

The invention claimed is:

1. A method for use in a digital frequency synthesizer, the method comprising phase to amplitude conversion of an output value of a phase accumulator in said synthesizer, said coversion being carried out as an approximation of an amplitude which corresponds to an output phase value of the phase accumulator, wherein the approximation comprises a combination of a linear interpolation value and a second order sinusoidal term, the second order sinusoidal term being used as an error term to correct for errors in the linear interpolation value, wherein the approximation is expressed as $$y(x) \approx Y(k) + \frac{Y(k+1) - Y(k)}{d} \cdot (x - kd) + Y(k) \cdot Y\left(\left\lfloor \frac{x-kd}{d} \cdot 2^{N-1} \right\rfloor\right) \cdot \left[1 - \cos\left(\frac{d}{2}\right)\right],$$

$$k = \left\lfloor \frac{x}{d} \right\rfloor$$

where:
d=2π/$2^N$, with N being a natural number, and

Y(k)=sin(k·d), and $$k = \left\lfloor \frac{x}{d} \right\rfloor$$

means that k is the integer part of x/d,
x is from 0 to 2π radians.

2. The method of claim 1, wherein the error term comprises a weighting function which can be adjusted to optimize the approximation.

3. The method of claim 1, wherein 1−cos(d/2) is used as a weighting factor in said second order sinusoidal term.

4. A phase to amplitude converter for use in a digital frequency synthesizer, the converter comprising means for phase to amplitude conversion of an output value of a phase accumulator in said synthesizer, said conversion means comprising means for approximating an amplitude which corresponds to an output phase value of the phase accumulator, wherein the approximation means use a combination of a linear interpolation value and a second order sinusoidal term, and the second order sinusoidal term is used by the approximation means as an error tam to correct for errors in the linear interpolation value, wherein the approximation means use the following expression in order to arrive at the approximation:

$$y(x) \approx Y(k) + \frac{Y(k+1) - Y(k)}{d} \cdot (x - kd) + Y(k) \cdot Y\left(\left\lfloor \frac{x-kd}{d} \cdot 2^{N-1} \right\rfloor\right) \cdot \left[1 - \cos\left(\frac{d}{2}\right)\right],$$

$$k = \left\lfloor \frac{x}{d} \right\rfloor$$

where:
d=2π/2$^N$, with N being a natural number, and
Y(k)=sin(k·d), and $$k = \left\lfloor \frac{x}{d} \right\rfloor$$

means that k is the integer part of x/d,
x is from 0 to 2π radians.

5. The converter of claim 4, in which the error term comprises a weighting function which is used by the conversion means to optimize the approximation.

6. The converter of claim 4, in which the conversion means use the term [1−cos(d/2)] as a weighting factor in said second order sinusoidal term.

7. The converter of claim 4, which uses a separate look up table, LUT, for at least one of file following terms:

$$Y(k) \quad\quad (LUT\ 1)$$

$$Y(k+1) - Y(k) \quad\quad (LUT\ 2)$$

$$Y\left(\left\lfloor \frac{x-kd}{d} \cdot 2^{N-1} \right\rfloor\right) \quad (LUT\ 3).$$

\* \* \* \* \*

UNITED STATES PATENT AND TRADEMARK OFFICE
CERTIFICATE OF CORRECTION

PATENT NO. : 8,473,534 B2  
APPLICATION NO. : 12/531764  
DATED : June 25, 2013  
INVENTOR(S) : Zhang Page 1 of 1

It is certified that error appears in the above-identified patent and that said Letters Patent is hereby corrected as shown below:

In the Specification

In Column 4, Line 48, delete "$\delta_{max}$" and insert -- $\delta_{max}(x)$ --, therefor.

In Column 8, Lines 6-7, delete "4 bit×4 bit=6 bit" and insert -- 4 bit×4 bit=16 bit --, therefor.

In the Claims

In Column 8, Line 50, in Claim 1, delete "coversion" and insert -- conversion --, therefor.

Signed and Sealed this  
Fourth Day of November, 2014

Michelle K. Lee  
*Deputy Director of the United States Patent and Trademark Office*